United States Patent [19]

Kelly

[11] 4,158,066

[45] Jun. 12, 1979

[54] STABILIZATION OF RICE POLISH

[75] Inventor: Vincent J. Kelly, Fremont, Mich.

[73] Assignee: Gerber Products Company, Fremont, Mich.

[21] Appl. No.: 926,776

[22] Filed: Jul. 21, 1978

[51] Int. Cl.² ............................................. A23K 3/02
[52] U.S. Cl. ................................... 426/419; 426/627; 426/520
[58] Field of Search ............... 426/618, 627, 640, 472, 426/465, 481, 482, 483, 489, 419, 520

[56] References Cited

U.S. PATENT DOCUMENTS

| | | | |
|---|---|---|---|
| 2,585,978 | 2/1952 | Van Atta et al. | 426/461 |
| 2,610,914 | 9/1952 | Cassidy et al. | 426/541 |
| 3,036,919 | 5/1962 | Kretschmer et al. | 426/465 |
| 3,925,564 | 12/1975 | Finnell | 426/482 |

*Primary Examiner*—S. Leon Bashore
*Assistant Examiner*—Michael Goldman
*Attorney, Agent, or Firm*—Townsend and Townsend

[57] ABSTRACT

The treatment of rice polish by drying into a specific moisture content so that the rice polish is stabilized and resists deterioration for long periods of time even when stored without refrigeration. The moisture content ranges from 5.8 to 8.0 grams of moisture/100 grams of fat free solids which corresponds to a single molecular layer of water (a mono layer film) on each rice polish particle. This minimizes both fatty acid development and oxidative rancidity.

3 Claims, No Drawings

STABILIZATION OF RICE POLISH

BACKGROUND OF THE INVENTION

Rice polish is a by-product from milling rice, consisting of the inner bran layers of the kernel with part of the germ and a small portion of the starchy interior. Since the protein and other non-carbohydrate constituents, such as B vitamins, minerals and fat, are located in the outer peripheral portion of the rice kernel, rice polish is considerably more nutritious than milled rice. Rice polish contains approximately 10–12% protein and 12–15% fat, whereas milled rice contains approximately 6–7% protein and 1% fat.

Rice polish suitable for human use is difficult to obtain. The quantity of polish produced during the milling of rice is usually less than 1% of the total rice kernel. The fat content is very susceptible to both oxidative rancidity and hydrolytic rancidity that is produced by the lipase and lipoxidase enzymes in the polish. Although the rice polish when initially collected exhibits minimal fat deterioration, to prevent free fatty acid development it is normally stored at 28° F. during shipment.

In spite of the care taken to protect the quality of rice polish, excessive free fatty acid development occasionally takes place. Such free fatty acids react with the starch and inhibit the action of diastatic enzyme systems during subsequent cereal processing to adversely affect quality, production rates and yield of such cereals. In addition, the resulting deterioration or oxidative rancidity imparts undesirable taste and texture characteristics to the final cereal product.

The development of free fatty acids in grains during storage has been studied by numerous investigators. Fatty acids are readily formed by lipase from the fats in grains, particularly under storage conditions of high temperature and high humidity. Molds, such as Aspergillus and Penicillum which produce lipase, will grow on grain and cause fatty acids to be produced from the grain.

While it is known that low temperature storage will retard free fatty acid development in rice polish, adequate cold storage facilities are not readily available in those areas where rice mills are usually situated. Another problem associated with the cold storage of rice polish is the relatively insignificant rate at which the rice polish is produced during milling. This necessitates the preliminary storage of polish under unfavorable temperature conditions until adequate quantities are collected to justify transportation to the cold storage area.

Controlled humidity storage in which the relative humidity in the storage area is maintained below about 40% to 50% has been investigated and found to also retard the formation of free fatty acids. However, in order to obtain maximum stabilization of the fat by this method, the free fatty acid content in the polish at the time the polish is introduced to the controlled humidity conditions must be very low.

Previous efforts to stabilize rice polish have involved inactivating the enzymes by infra-red heat. U.S. Pat. Nos. 2,585,978 and 2,610,914 are representative of patents disclosing such heat stabilization of rice bran, wheat bran and wheat germ. Although thermal inactivation of the lipase and lipoxidase enzymes inhibits the development of free fatty acids, frequently oxidative rancidity is enhanced due to the insufficient moisture in the material. As a consequence, prior art process techniques have not been widely practiced.

It is therefore an object of this invention to provide a method for stabilizing rice polish regardless of the section of the country in which it is produced, so that the rice polish is resistant to deterioration for exceptionally long periods of time.

Another object is to provide a method that is effective in resisting the formation of free fatty acid in rice polish that is adaptable for use at or near the place where rice polish is produced.

A still further object is to provide a method that is effective to inhibit oxidative rancity of rice polish.

Other objects, features and advantages of this invention will become apparent from a reading of this disclosure.

SUMMARY OF THE INVENTION

It has now been discovered that by adjusting the moisture content of rice polish to that corresponding to a single molecular layer of water (a mono layer film) on each rice polish particle, both fatty acid development and oxidative rancidity can be minimized. Stated another way, it has been found that lipid oxidation increases significantly when the moisture level of the rice polish is below the mono layer value while lipid hydrolysis is accelerated when the moisture level of the rice polish is above the mono layer value. As a result, shelf life of the thus moisture-adjusted rice polish is maximized, even at ambient temperature. The moisture content is preferably reduced as quickly as possible after milling so that a minimum of free fatty acids is formed.

In practicing this invention, it is preferable that the moisture content of the rice polish be reduced to the mono layer range 5.8 to 8 grams of moisture/100 grams of fat free solids. If, in addition to adjusting the moisture content of the rice polish to the mono layer level, the storage temperature is maintained in the range of 32°–74° F., more advantageously 35°–45° F. and preferably about 40° F., the period of stabilized storage will be even further increased and infestation will be prevented.

DESCRIPTION OF PREFERRED EMBODIMENTS

Effect of moisture and temperature on the stability of the fat in rice polish is illustrated by the following data. Rice polish was dried to 4.5%, 5.8%, 6.8%, 8.0% and 10.5% moisture in a laboratory freeze drier. Approximately 80 gram samples were hermetically sealed in 4½ oz. juice cans and placed in storage at 40° F. (4° C.), 74° F. (24° C.), 95° F. (35° C.) and 130° F. (55° C.). At various periods of time, samples were evaluated for development of free fatty acids and conjugated oxodiene products during storage and are reported in Tables I and II. The conjugated oxodiene product is a measure of oxidation of fat.

the low moisture samples oxidized to a greater degree than the fat in the high moisture samples.

TABLE I

FREE FATTY ACID (IN % WEIGHT) IN RICE POLISH DURING STORAGE

| WEEKS STORAGE | 40° F. MOISTURE CONTENT (%) | | | | | 74° F. MOISTURE CONTENT (%) | | | | | 95° F. MOISTURE CONTENT (%) | | | | | 130° F. MOISTURE CONTENT (%) | | | |
|---|---|---|---|---|---|---|---|---|---|---|---|---|---|---|---|---|---|---|---|
| | 4.5 | 5.8 | 6.8 | 8.0 | 10.5 | 4.5 | 5.8 | 6.8 | 8.0 | 10.5 | 4.5 | 5.8 | 6.8 | 8.0 | 10.5 | 5.0 | 5.8 | 8.0 | 10.5 |
| 0 | | | | | | | | | | | | | | | | | | | |
| 1 | 3.1 | 3.4 | 3.9 | 3.4 | 3.2 | 2.6 | 3.4 | 3.4 | 3.4 | 3.4 | 3.4 | 3.4 | 3.9 | 3.4 | 3.2 | 3.4 | 3.4 | 3.4 | 3.2 |
| 2 | | | 3.5 | | | 2.6 | 3.1 | 3.9 | 3.8 | 4.6 | | | | | | 5.1 | 5.1 | 6.0 | 9.5 |
| 3 | | | | | | | | | | | | | 5.3 | | | | | | |
| 4 | 2.5 | 2.8 | | 3.0 | 3.6 | | | | | | | | | | | 5.1 | 7.1 | 8.9 | 13.6 |
| 5 | | | | | | 3.1 | 4.0 | 4.5 | 5.0 | 7.9 | 3.7 | 4.3 | | 7.1 | 9.3 | | | | |
| 7 | | | | | | | | | | | | | 7.4 | | | | | | |
| 8 | | | | | | | | | | | | | | | | | | | 23.6 |
| 9 | | | | | | | | | | | (7.1) | 4.9 | | 9.4 | 11.1 | | | | |
| 11 | | 3.9 | | | | | | | | | | | | | | 14wks 8.0 | 14wks 10.3 | 14wks 13.4 | 14wks 28.3 |
| 13 | 3.0 | 3.0 | | 4.1 | 6.2 | | | | | | | | | | | | | | |
| 15 | | | | | | | | | | | (9.1) | 5.7 | 8.5 | 9.8 | 13.0 | | | | |
| 16 | | 3.8 | | | | 3.4 | 4.1 | 5.8 | 7.0 | 11.1 | | | | | | | | | |
| 18 | 2.7 | 4.1 | | 4.5 | 6.8 | | | | | | | | | | | | | | |
| 21 | | | 4.3 | | | | | | | | | | | | | | | | |
| 22 | | | | | | 3.9 | 4.7 | 7.1 | 9.4 | 13.5 | | | | | | | | | |
| 23 | 2.9 | 3.1 | | 4.3 | 10.2 | | | | | | | | | | | | | | |
| 55 | | 5.36 | 7.9 | | 13.8 | | 8.58 | 12.6 | 17.7 | 22.5 | | | 18.4 | | 51.6 | | | | |

TABLE II

CONJUGATED OXODIENE PRODUCTS DEVELOPMENT IN RICE POLISH DURING STORAGE

| WEEKS STORAGE | 40° F. MOISTURE CONTENT (%) | | | | | 74° F. MOISTURE CONTENT (%) | | | | | 95° F. MOISTURE CONTENT (%) | | | | | 130° F. MOISTURE CONTENT (%) | | | |
|---|---|---|---|---|---|---|---|---|---|---|---|---|---|---|---|---|---|---|---|
| | 4.5 | 5.8 | 6.8 | 8.0 | 10.5 | 4.5 | 5.8 | 6.8 | 8.0 | 10.5 | 4.5 | 5.8 | 6.8 | 8.0 | 10.5 | 5.0 | 5.8 | 8.0 | 10.5 |
| 0 | 8.8 | 8.7 | 9.9 | 8.8 | 8.9 | 8.8 | 8.7 | 9.9 | 8.8 | 8.9 | 8.8 | 8.7 | 9.9 | 8.8 | 8.9 | 8.8 | 8.7 | 8.8 | 8.9 |
| 1 | | | | | | | | | | | 9.4 | 9.3 | | 8.6 | 7.8 | 10.0 | 10.2 | 10.6 | 9.6 |
| 2 | | | 13.1 | | | 9.4 | 9.5 | 9.9 | 8.2 | 8.2 | | | 9.9 | | | 9.6 | 9.5 | 9.1 | 10.1 |
| 3 | | | | | | | | | | | | | | | | | | | |
| 4 | 10.3 | 10.9 | | 12.8 | 10.7 | | | | | | | | | | | 11.1 | 10.8 | 11.6 | 10.6 |
| 5 | | | | | | 14.0 | 13.2 | 12.3 | 12.1 | 10.2 | 14.6 | 11.5 | | 8.6 | 9.6 | | | | |
| 7 | | | | | | | | | | | | | 19.9 | | | | | | |
| 8 | | | | | | | | | | | | | | | | | | | 13.8 |
| 9 | | | | | | | | | | | 14.5 | 16.5 | | 12.8 | 14.1 | | | | |
| 11 | | | 13.4 | | | | | | | | | | | | | | | | |
| 13 | 13.5 | 14.0 | | 11.9 | 12.0 | | | | | | | | 16.5 | | | | | | |
| 14 | | | | | | | | | | | | | | | | 26.7 | 22.6 | 22.1 | 15.9 |
| 15 | | | | | | | | | | | 24.0 | 18.0 | | 16.3 | 15.3 | | | | |
| 16 | | | 13.5 | | | 21.6 | 13.7 | 14.9 | 12.9 | 13.5 | | | | | | | | | |
| 18 | 15.0 | 14.0 | | 12.8 | 13.1 | | | | | | | | | | | | | | |
| 21 | | | 14.6 | | | | | | | | | | | | | | | | |
| 22 | | | | | | 24.0 | 19.8 | 16.1 | 14.4 | 15.1 | | | | | | | | | |
| 23 | 16.6 | 15.3 | | 13.3 | 13.5 | | | | | | | | | | | | | | |
| 55 | | 22.0 | 19.8 | | 21.0 | | 26.1 | 21.1 | 20.8 | 23.37 | | | 26.7 | | 30.36 | | | | |

It can be seen from the data that the amount of free fatty acid development is closely related to moisture content and storage temperature. As the moisture content is raised, the development of free fatty acid accelerates. Conversely, however, as the moisture content decreases, the quantity of conjugated oxodienes increases. The lipase enzyme hydrolysis of the fatty acid from the fat requires water. The rate of enzyme reactions are markedly affected by the temperature.

While it has been found that low moisture and temperatures retard free fatty acid development, the fat in

What is claimed:

1. A method for stabilizing rice polish comprising reducing the moisture content of said rice polish into the mono layer range of 5.8 to 8.0 grams of moisture/100 grams of fat free solids.

2. A method for stabilizing rice polish in accordance with claim 1 and further characterized by maintaining the rice polish at a temperature in the range of 32°–74° F. during storage.

3. A method for stabilizing rice polish in accordance with claim 2 and further characterized by maintaining the rice polish at a temperature of about 40°.

* * * * *